US012158712B2

(12) United States Patent
Konishi et al.

(10) Patent No.: US 12,158,712 B2
(45) Date of Patent: Dec. 3, 2024

(54) TRANSFER DEVICE, IMAGE FORMING APPARATUS, PRESSING DEVICE, AND BELT DEVICE

(71) Applicants: Takahiro Konishi, Tokyo (JP); Hiroaki Takagi, Kanagawa (JP)

(72) Inventors: Takahiro Konishi, Tokyo (JP); Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/512,008

(22) Filed: Nov. 16, 2023

(65) Prior Publication Data

US 2024/0168415 A1 May 23, 2024

(30) Foreign Application Priority Data

Nov. 22, 2022 (JP) ................................ 2022-186592

(51) Int. Cl.

| | |
|---|---|
| ***G03G 15/16*** | (2006.01) |
| ***G03G 15/00*** | (2006.01) |
| ***G03G 15/01*** | (2006.01) |
| ***G03G 21/16*** | (2006.01) |

(52) U.S. Cl.

CPC ..... *G03G 15/1685* (2013.01); *G03G 15/0131* (2013.01); *G03G 15/1605* (2013.01); *G03G 15/1665* (2013.01); *G03G 15/167* (2013.01); *G03G 15/6558* (2013.01); *G03G 21/168* (2013.01); *G03G 2215/00088* (2013.01); *G03G 2215/00409* (2013.01); *G03G 2215/1623* (2013.01)

(58) Field of Classification Search

CPC ........... G03G 15/0131; G03G 15/1605; G03G 15/1615; G03G 15/1665; G03G 15/167; G03G 15/1685; G03G 15/6558; G03G 21/168; G03G 2215/00088; G03G 2215/00409

See application file for complete search history.

(56) References Cited

U.S. PATENT DOCUMENTS

2013/0243482 A1* 9/2013 Kato .................... G03G 15/161 399/121
2014/0072340 A1* 3/2014 Kato .................. G03G 15/1605 399/302
2018/0074455 A1 3/2018 Takagi
2019/0286017 A1 9/2019 Nakamoto et al.
2020/0004187 A1 1/2020 Takagi et al.
(Continued)

FOREIGN PATENT DOCUMENTS

JP 2001-255717 A 9/2001
JP 2013-101208 A 5/2013

*Primary Examiner* — Joseph S Wong
(74) *Attorney, Agent, or Firm* — XSENSUS LLP

(57) ABSTRACT

A transfer device includes a pressed unit, a rotatable roller, and a pressing member. The pressed unit is movably supported and includes a first non-rotatable shaft portion and a second non-rotatable shaft portion. The rotatable roller is rotatably supported by the first non-rotatable shaft portion of the pressed unit. The pressing member contacts the second non-rotatable shaft portion of the pressed unit and presses the pressed unit. The second non-rotatable shaft portion has an axial center aligned with an axial center of the first non-rotatable shaft portion.

11 Claims, 7 Drawing Sheets

(56) References Cited

U.S. PATENT DOCUMENTS

| | | | |
|---|---|---|---|
| 2020/0063851 | A1 | 2/2020 | Nakamoto et al. |
| 2020/0064765 | A1 | 2/2020 | Suga et al. |
| 2020/0133172 | A1 | 4/2020 | Konishi et al. |
| 2020/0174395 | A1 | 6/2020 | Takagi |
| 2020/0326648 | A1 | 10/2020 | Maehata et al. |
| 2021/0188578 | A1 | 6/2021 | Takagi |
| 2021/0302891 | A1* | 9/2021 | Matsushita ............ B65H 5/021 |
| 2022/0308517 | A1 | 9/2022 | Takagi |
| 2023/0042229 | A1 | 2/2023 | Nakamura et al. |
| 2023/0090307 | A1 | 3/2023 | Konishi |

* cited by examiner

TRANSFER DEVICE, IMAGE FORMING APPARATUS, PRESSING DEVICE, AND BELT DEVICE

CROSS-REFERENCE TO RELATED APPLICATION

This patent application is based on and claims priority pursuant to 35 U.S.C. § 119(a) to Japanese Patent Application No. 2022-186592, filed on Nov. 22, 2022, in the Japan Patent Office, the entire disclosure of which is hereby incorporated by reference herein.

BACKGROUND

Technical Field

Embodiments of the present disclosure relate to a transfer device, an image forming apparatus, a pressing device, and a belt device.

Related Art

A transfer device is known that includes a pressed unit that is movably supported, a rotatable roller that is rotatably supported by the pressed unit, and a pressing member that presses the pressed unit. The transfer device presses both shaft portions of a transfer roller (rotatable roller), which forms a secondary transfer nip for transferring an image from an intermediate transfer belt (image bearer) to a sheet, via both side walls of a roller holder that rotatably supports the shaft portions by bearings.

SUMMARY

In an embodiment of the present disclosure, there is provided a transfer device that includes a pressed unit, a rotatable roller, and a pressing member. The pressed unit is movably supported and includes a first non-rotatable shaft portion and a second non-rotatable shaft portion. The rotatable roller is rotatably supported by the first non-rotatable shaft portion of the pressed unit. The pressing member contacts the second non-rotatable shaft portion of the pressed unit and presses the pressed unit. The second non-rotatable shaft portion has an axial center aligned with an axial center of the first non-rotatable shaft portion.

In another embodiment of the present disclosure, there is provided an image forming apparatus that includes the transfer device.

In still another embodiment of the present disclosure, there is provided a pressing device that includes a pressed unit, a rotatable roller, a pressing member, and a pressing force adjuster. The pressed unit includes is movably supported and includes a first non-rotatable shaft portion and a second non-rotatable shaft portion. The rotatable roller is rotatably supported by the first non-rotatable shaft portion of the pressed unit. The pressing member contacts the second non-rotatable shaft portion of the pressed unit and presses the pressed unit. The second non-rotatable shaft portion has an axial center aligned with an axial center of the first non-rotatable shaft portion. The pressing force adjuster adjusts a pressing force of the pressing member to the pressed unit.

In still yet another embodiment of the present disclosure, there is provided a belt device that includes a pressed unit, a rotatable roller, a plurality of support members, a belt, and a pressing member. The pressed unit includes is movably supported and includes a first non-rotatable shaft portion and a second non-rotatable shaft portion. The rotatable roller is rotatably supported by the first non-rotatable shaft portion of the pressed unit. The plurality of support members include the rotatable roller. The belt is supported by the plurality of support members. The pressing member contacts the second non-rotatable shaft portion of the pressed unit and presses the pressed unit. The second non-rotatable shaft portion has an axial center aligned with an axial center of the first non-rotatable shaft portion.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
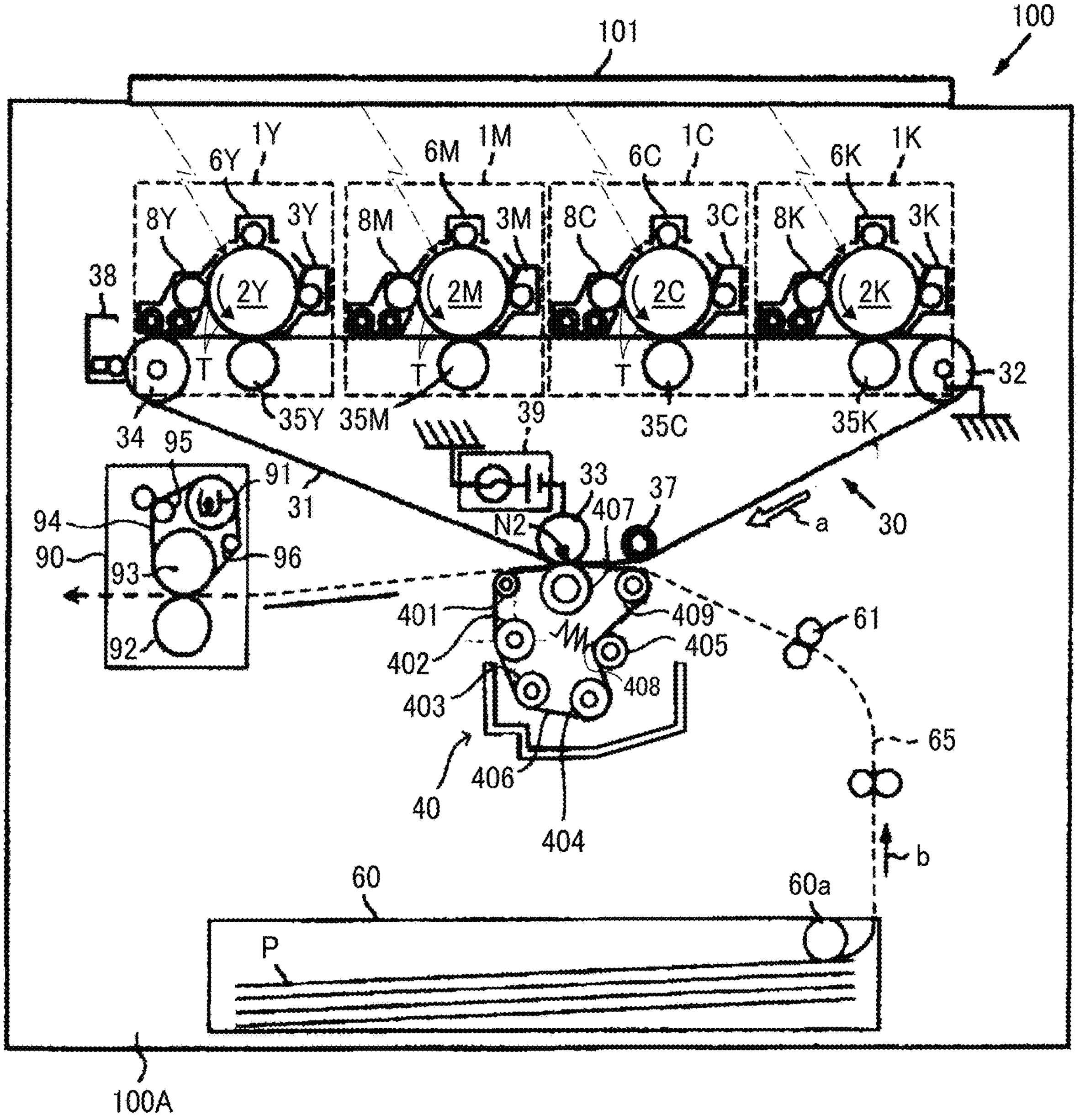
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic diagram of an electrophotographic color printer 100 that serves as an image forming apparatus according to an embodiment of the present disclosure. Such an electrophotographic color printer according to the present embodiment may be referred to simply as a printer 100 in the following description. The printer 100 includes four image forming units 1Y, 1M, 1C, and 1K for forming toner images of colors of yellow (Y), magenta (M), cyan (C), and black (K), respectively. The printer 100 also includes an intermediate transfer unit 30 as an image bearer unit, a secondary transfer unit 40 as a transfer unit, a sheet tray 60 for storing a sheet P as a recording material (recording medium), and a fixing device 90.

The four image forming units 1Y, 1M, 1C, and 1K that serve as image forming sections use Y, M, C, and K toners, which are different colors from each other, as powder developers. The other components have a similar structure except the color of the toner.

The image forming units 1Y, 1M, 1C, and 1K include drum-shaped photoconductors 2Y, 2M, 2C, and 2K serving as latent image bearers, photoconductor cleaners 3Y, 3M, 3C, and 3K, dischargers, charging devices 6Y, 6M, 6C, and 6K, and developing devices 8Y, 8M, 8C, and 8K, respectively.

The surfaces of the photoconductors 2Y. 2M. 2C, and 2K are uniformly charged by the charging devices 6Y, 6M, 6C, and 6K. The surfaces of the photoconductors 2Y, 2M, 2C, and 2K are optically scanned by exposure light such as laser beams emitted from an optical writing unit 101 disposed above the image forming units 1Y, 1M, 1C, and 1K to form electrostatic latent images for yellow, magenta, cyan, and black images, respectively. The developing devices 8Y, 8M, 8C, and 8K develop the electrostatic latent images on the photoconductors 2Y, 2M, 2C, and 2K with yellow, magenta, cyan, and black toners, respectively, into visible toner images T. The toner images T on the photoconductors 2Y. 2M, 2C, and 2K are primarily transferred and borne on an outer circumferential surface (on a side of the outer surface layer) of an intermediate transfer belt 31 as an endless belt.

The intermediate transfer unit 30 is disposed below the image forming units 1Y, 1M, 1C, and 1K and drives to rotate the intermediate transfer belt 31 clockwise in FIG. 1 while stretching the intermediate transfer belt 31. A direction of rotation of the intermediate transfer belt 31 is referred to as a "belt travel direction" indicated by a white arrow a in FIG. 1.

The intermediate transfer unit 30 includes, in addition to the intermediate transfer belt 31, a drive roller 32, a secondary transfer backup roller 33, a cleaning backup roller 34, four primary transfer rollers 35Y, 35M, 35C, and 35K, and a pre-transfer roller 37. The intermediate transfer belt 31 is looped around, supported by, and stretched between the drive roller 32, the secondary transfer backup roller 33, the cleaning backup roller 34, the four primary transfer rollers 35Y, 35M, 35C, and 35K, and the pre-transfer rollers 37. The intermediate transfer belt 31 is driven by the rotational power of the drive roller 32, which is driven to rotate clockwise in FIG. 1 by a driver such as a drive motor, and is moved and conveyed clockwise as an endless belt.

The secondary transfer unit 40 including a secondary transfer belt 406 that is an endless belt as a transferor is disposed below the outside of the loop of the intermediate transfer belt 31. The secondary transfer belt 406 is looped around a separation roller 401, driven rollers 402 and 403, a drive roller 404, a tension roller 405, a skew prevention roller 409, and a secondary transfer roller 407. These rollers correspond to support members for the secondary transfer belt 406, and the secondary transfer roller 407 corresponds to a rotatable roller. The secondary transfer unit 40 may include, for example, a cleaner and a lubricant applicator.

The tension roller 405 is disposed at a region of the secondary transfer belt 406 where the secondary transfer belt 406 is stretched between the drive roller 404 and the skew prevention roller 409, and presses the region toward the inside of the loop by a biasing force of a spring 408. The region of the secondary transfer belt 406 that is stretched by the drive roller 404 and the skew prevention roller 409 is pressed by the tension roller 405 so as to be recessed toward the inside of the loop of the secondary transfer belt 406. As a result, the winding angle of the secondary transfer belt 406 to the drive roller 404 and the winding angle of the secondary transfer belt 406 to the skew prevention roller 409 can be set to 90° or more.

The sheet tray 60 that is a container to store a bundle of multiple sheets P is disposed below the secondary transfer unit 40 in FIG. 1. In the sheet tray 60, a roller 60*a* contacts an uppermost recording medium P of the bundle of recording media. The roller 60*a* is driven to rotate at a specified timing to feed the recording medium P from the sheet tray 60 to a conveyance passage 65 toward a secondary transfer nip N2. A registration roller pair 61 feeds the recording medium P fed in the conveyance passage 65 to the secondary transfer nip N2 at a timing synchronized with the toner image on the outer circumferential surface of the intermediate transfer belt 31.

A toner image on the outer circumferential surface of the intermediate transfer belt 31 is collectively transferred onto the recording medium P by a secondary transfer electric field and a nip pressure in the secondary transfer nip N2, thereby forming a full-color toner image in combination with the white color of the recording medium P.

The fixing device 90 is disposed downstream from the secondary transfer nip N2 in a sheet conveyance direction b (in a conveyance direction of the recording medium P). As illustrated in FIG. 1, the fixing device 90 includes a heating roller 91, a fixing roller 93, a support roller 96, and a tension roller 95, serving as support rollers for a fixing belt 94. The fixing device 90 also includes a pressing roller 92 that contacts the fixing roller 93 with the fixing belt 94 interposed therebetween. The recording medium P to which the toner image has been transferred is fed to the fixing device 90 and is nipped at a fixing nip at which the fixing roller 93 and the pressing roller 92 contact each other. The fixing device 90 transfers heat from the heating roller 91 that includes a heat source therein to the recording medium P via the fixing belt 94. The heat and pressure in the fixing nip soften and fix the toner in the full-color toner image onto the recording medium P. After the toner image is fixed on the sheet P, the sheet P is ejected from the fixing device 90 and ejected outside of the printer 100.

Figure 2:
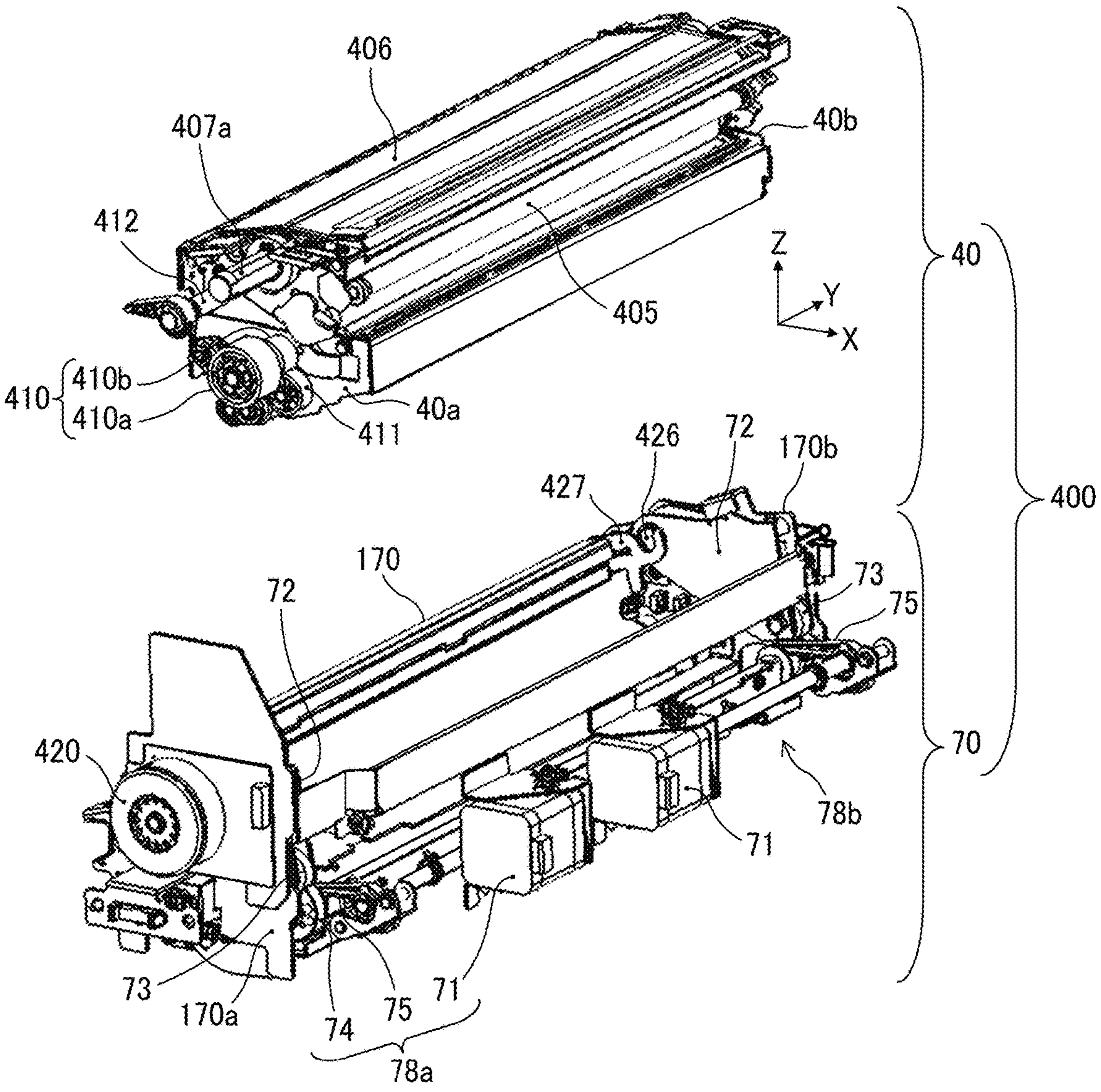
FIG. 2 is a perspective view of a secondary transfer device as a pressing device, according to an embodiment of the present disclosure.
Figure 3:
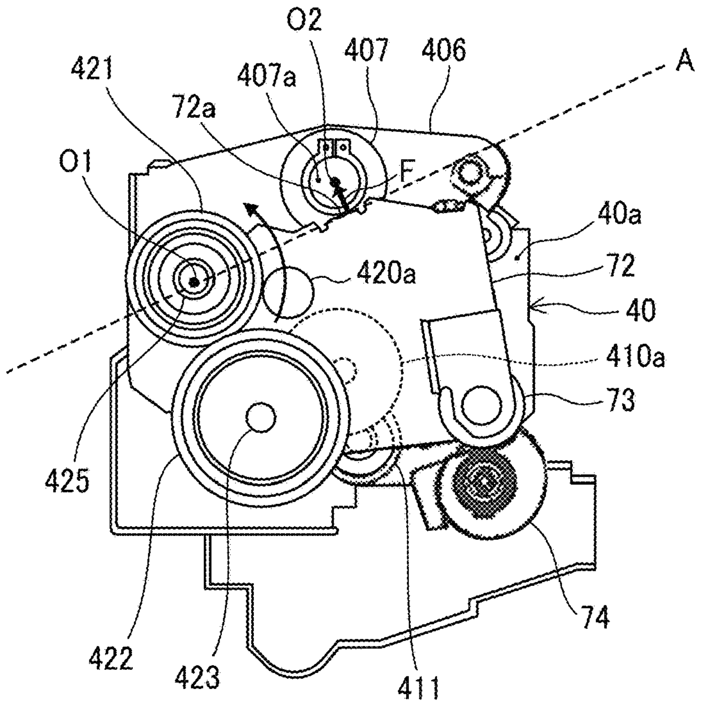
FIG. 3 is a front view of a secondary transfer device illustrating its elements on the near side, according to an embodiment of the present disclosure.
Figure 4:
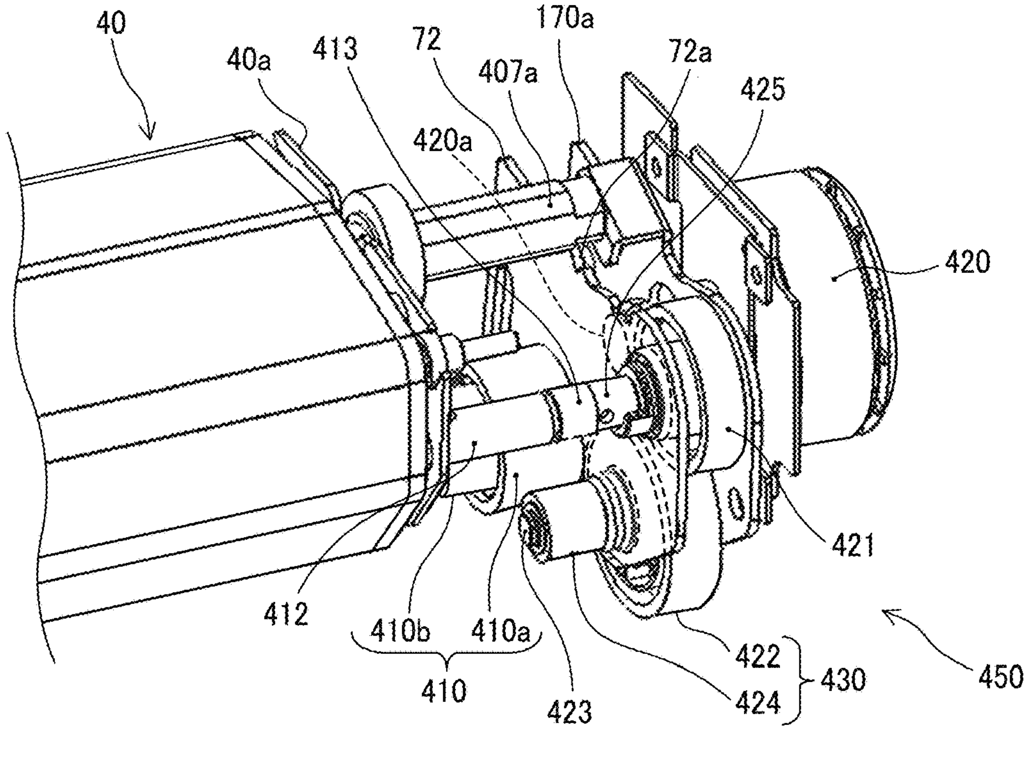
FIG. 4 is a perspective view of a roller drive transmission mechanism, according to an embodiment of the present disclosure.

FIG. 2 is a perspective view of a secondary transfer device 400 as a pressing device, according to the present embodiment. FIG. 3 is a front view of the secondary transfer device 400 illustrating its elements on the near side, according to the present embodiment. FIG. 4 is a perspective view of a roller drive transmission mechanism 450 according to an embodiment of the present disclosure. As illustrated in FIG. 2, the secondary transfer device 400 includes the secondary transfer unit 40 as a pressed unit and a pressing unit 70.

A secondary transfer motor 420 serving as a drive source for driving to rotate the secondary transfer belt 406 is disposed in a side plate 170*a* on the near side of a pressure frame 170 of the pressing unit 70 on the near side in FIG. 2. The secondary transfer unit 40 includes a pair of side plates 40*a* and 40*b*. A secondary-transfer two-stage gear 410 as a unit drive transmission member is rotatably supported by a side plate 40*a* on the near side in FIG. 2 of the pair of side plates 40*a* and 40*b* of the secondary transfer unit 40. An output gear 411 that is disposed on a shaft of the drive roller 404 (see FIG. 1) meshes with a small-diameter gear portion 410*b* of the secondary-transfer two-stage gear 410. A large-diameter gear portion 410*a* of the secondary-transfer two-stage gear 410 meshes with an in-arm output gear 424 (see FIG. 4) disposed on a pressing arm 72 to be described below.

The pressing unit 70 is provided with the pressing arms 72 as a pair of pressing members that contact a support shaft portion 407*a* that rotatably supports the secondary transfer roller 407. The support shaft portion 407*a* is a shaft member in which both ends are non-rotatably supported by the pair of side plates 40*a* and 40*b* that are both side walls of the secondary transfer unit 40. A portion of the support shaft portion 407*a* located between the pair of side plates 40*a* and 40*b* corresponds to a first non-rotatable shaft portion, and the secondary transfer roller 407 is rotatably supported on the first non-rotatable shaft portion. Portions of the support shaft portion 407*a* protruding outward in the axial direction from the pair of side plates 40*a* and 40*b* correspond to a second non-rotatable shaft portion. The first non-rotatable shaft portion and the second non-rotatable shaft portion have axial centers aligned with each other.

The pressing arms 72 are disposed inward from the side plates 170*a* and 170*b* of the pressure frame 170 in the axis direction. The pressing arm on the far side in FIG. 2 is rotatably supported by a support shaft 426 disposed in the side plate 170*b* on the far side. The pressing arm on the near side in FIG. 2 is rotatably supported by a support shaft 425 disposed on the side plate 170*a* on the near side (see FIG. 4).

The pressing unit 70 includes a first pressing drive device 78*a* that rotates the pressing arm 72 on the near side in FIG. 2 and a second pressing drive device 78*b* that rotates the pressing arm on the far side in FIG. 2. The first pressing drive device 78*a* and the second pressing drive device 78*b* have the same configuration. A pressing motor 71 that serves as a pressing drive source of each pressing drive device is disposed near the center in the axis direction. The driving force of the pressing motor 71 is transmitted to a pressing cam 74, which serves as a cam, via, for example, a timing belt 75. The pressing cam 74 contacts a cam receiving roller 73 disposed near a lower portion of the pressing arm 72 opposite to the support shafts.

The secondary transfer unit 40 is moved vertically downward to be assembled to the pressing unit 70. At this time, the end of the near side of a connecting shaft 412 of the secondary transfer unit 40 is supported by a groove 427 fixed to the support shaft 426 on the far side that rotatably supports the pressing arm 72 on the far side. On the other hand, an end of the connecting shaft 412 on the near side is inserted into a connecting hole member 413 attached to a tip of the support shaft 425 on which the pressing arm 72 on the near side is rotatably supported and is supported by the connecting hole member 413. Both ends of the connecting shaft 412 are supported by the support shaft 426 and the support shaft 425, and the secondary transfer unit 40 is rotatable with the points as fulcrums. The connecting shaft 412 is placed coaxially with the support shafts 425 and 426 of the pressing unit 70. The fulcrum of rotation of the secondary transfer unit 40 and the fulcrum of rotation of the pressing arm 72 are placed coaxially with each other.

A shaft member that is non-rotatably supported by both side plates of the secondary transfer unit 40 can be used as the support shaft 426. A belt support roller can be rotatably held at a portion of the shaft member between both side plates of the secondary transfer unit 40.

When the secondary transfer unit 40 is assembled to the pressing unit 70, the far side and the near side of the support shaft portion 407*a* of the secondary transfer roller contact and are supported by contact portions 72*a* of the pressing arms 72. As illustrated in FIG. 3, the pressing arm 72 is disposed facing the side plate 40*a* of the secondary transfer unit 40 and is housed in the secondary transfer unit 40 as viewed in the axis direction. As a result, the secondary transfer device 400 can be miniaturized.

As illustrated in FIGS. 3 and 4, the secondary transfer device 400 includes the roller drive transmission mechanism 450 serving as a drive transmission mechanism that transmits the driving force of the secondary transfer motor 420 to the secondary-transfer two-stage gear 410 of the secondary transfer unit 40 on one side in the axis direction. The roller drive transmission mechanism 450 includes a pressure-side idler gear 421 serving as a first drive transmission member that meshes with a motor gear 420*a* of the secondary transfer motor 420, and an in-arm gear portion 430 disposed in the pressing arm 72. The pressure-side idler gear 421 is disposed between the pressing arm 72 and the side plate 170*a* on the near side of the pressure frame 170 and is rotatably supported by the support shaft 425.

The in-arm gear portion 430 includes an in-arm input gear 422 and the in-arm output gear 424 serving as a pressing-member-side drive transmission member. The in-arm input gear 422 and the in-arm output gear 424 are attached to a through shaft 423 that penetrates the pressing arm 72 and is rotatably supported by the pressing arm 72. The in-arm input gear 422 is attached to a portion of the through shaft 423 closer to the secondary transfer motor 420 with respect to the pressing arm 72 interposed therebetween, and meshes with the pressure-side idler gear 421. The in-arm output gear 424 is attached to a portion of the through shaft 423 closer to the secondary transfer unit 40 with respect to the pressing arm 72, and meshes with the large-diameter gear portion 410*a* of the secondary-transfer two-stage gear 410 of the secondary transfer unit 40.

The pressure-side idler gear 421 that meshes with the in-arm input gear 422 disposed on the pressing arm 72 is disposed on the support shaft 425 that is the fulcrum of rotation of the pressing arm 72. Even when the pressing arm 72 rotates, the distance between the rotation centers of the pressure-side idler gear 421 and the in-arm input gear 422 does not change. Thus, preferable meshing between the in-arm input gear 422 and the pressure-side idler gear 421 can be maintained.

The secondary transfer unit 40 rotates with the pressing arm 72. During this rotation, the rotation fulcrum of the secondary transfer unit 40 and the rotation fulcrum of the pressing arm 72 are located on the same axis, and thus the distance between the rotation axes of the in-arm output gear 424 and the secondary-transfer two-stage gear 410 does not change. Due to such a configuration, preferable meshing between the in-arm output gear 424 and the large-diameter gear portion 410*a* of the secondary-transfer two-stage gear 410 can be maintained.

In order to apply a specified torque to the drive roller 404 of the secondary transfer unit 40, the rotation speed of the secondary transfer motor 420 is reduced to transmit the driving force to the output gear 411. Specifically, deceleration of the three stages is performed between the motor gear 420*a* and the in-arm input gear 422, between the in-arm output gear 424 and the large-diameter gear portion 410*a* of the secondary-transfer two-stage gear 410, and between the small-diameter gear portion 410*b* of the secondary-transfer two-stage gear 410 and the output gear 411. As a result, an increase in the diameter of each gear can be prevented to achieve a desired deceleration ratio.

The secondary transfer unit 40 can be attached to and detached from the pressing unit 70 easily. Accordingly, the secondary transfer unit 40 to be replaced due to, for example, abrasion of the secondary transfer belt 406 can be replaced periodically. In order to enable the secondary transfer unit 40 to be easily attached to and detached from the pressing unit 70 in the up and down direction of FIG. 2 that is orthogonal to the axis direction, the output gear 411 is disposed inside the pressing arm 72.

In order to transmit the driving force of the secondary transfer motor 420 to the inside from the outside in the axial direction across the pressing arm 72, the pressing arm 72 is provided with the in-arm gear portion 430 formed of a plurality of gears. According to this configuration, the pressing arm 72, the secondary transfer motor 420, and the gear of the roller drive transmission mechanism 450 can be housed in the secondary transfer unit 40 when viewed in the axis direction. Thus, an increase in the size of the secondary transfer device 400 can be prevented.

The in-arm input gear 422 is disposed in a lower space between the side plate 170*a* on the near side of the pressure frame 170 and the pressing arm 72. According to this configuration, the in-arm input gear 422 is formed large enough in diameter to obtain a large reduction ratio without protruding from the secondary transfer unit as viewed in the axial direction.

As illustrated in FIG. 3, the contact portion 72*a* that contacts the support shaft portion 407*a* of the secondary transfer roller 407 of the pressing arm 72 is flat. The contact portion 72*a* substantially overlaps a broken line A connecting between an axis center O1 of the support shaft 425, which is the rotation center of the pressing arm 72 illustrated in FIG. 3, and a contact position between the contact portion 72*a* and the support shaft portion 407*a* Specifically, the angle formed by the broken line A and the direction of the pressing force (indicated by an arrow F) applied to the support shaft portion 407*a* of the pressing arm 72 is set to be 90°±10°.

When the position of the support shaft portion 407*a* of the secondary transfer roller 407 deviates from the target position due to variations in components, such a configuration can prevent the deviation from greatly affecting the meshing of the in-arm output gear 424 and the large-diameter gear portion 410*a* of the secondary-transfer two-stage gear 410.

Figure 5A:
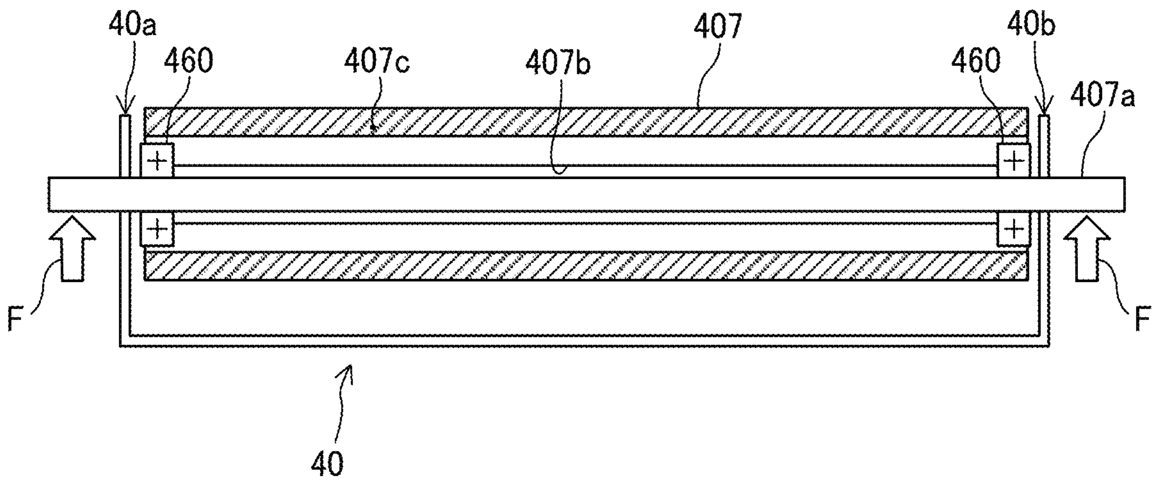
FIG. 5A is a schematic diagram of a pressure structure of a secondary transfer unit, according to an embodiment of the present disclosure.
Figure 5B:
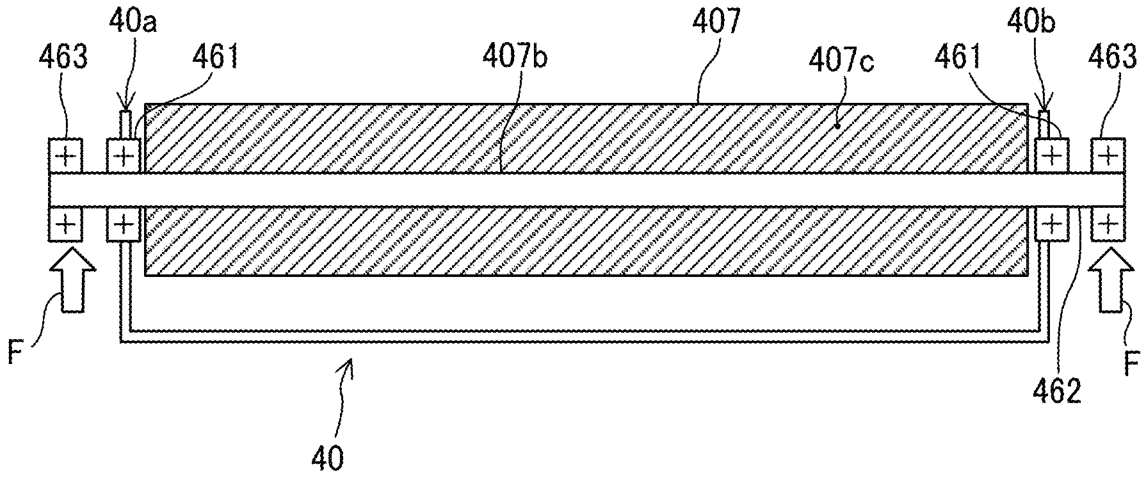
FIG. 5B is a schematic diagram of a pressure structure of a secondary transfer unit, according to a comparative example.

FIGS. 5A and 5B are schematic diagrams of the pressing structure of the secondary transfer unit 40. FIG. 5A is a schematic diagram of the pressing structure of the secondary transfer unit 40 according to an embodiment the present embodiment, and FIG. 5B is a schematic diagram of the pressing structure of the secondary transfer unit 40 according to a comparative example. The secondary transfer roller 407 having a hollow core metal portion 407*b* is rotatably disposed, via a pair of bearings 460 (e.g., ball bearings), at a position located between the pair of side plates 40*a* and 40*b* of the support shaft portion 407*a* as a fixed shaft fixed to the belt-type secondary transfer unit 40. As indicated by arrows F in FIGS. 5A and 5B, outwardly extending portions of the pair of side plates 40*a* and 40*b* of the support shaft portion 407*a* are directly pressed by the pressing arms that serves as the pressing members of a pressing mechanism. The secondary transfer roller 407 has an elastic layer 407*c* on the core metal portion 407*b*. Instead of the elastic layer 407*c*, a surface layer having no elasticity may be disposed.

In a comparative example illustrated in FIG. 5B, a rotatable shaft 462 of the secondary transfer roller 407 held by a pair of side plates 40*a* and 40*b* of a belt-type secondary transfer unit 40 via bearings 461 (e.g., ball bearings) is supported. Pressing section bearings 463 (e.g., ball bearings) disposed at both ends of the rotatable shaft 462 extending outward from the pair of side plates 40*a* and 40*b* of the secondary transfer unit 40 are pressed by pressing arms that serve as the pressing members of a pressing mechanism as indicated by a pair of arrows F. The reason why the pressing section bearings 463 are disposed at the ends of the secondary transfer roller and are pressed is that, when the rotating shaft is directly pressed, the shaft of the secondary transfer roller 407 itself rotates, and then the shaft slides with a pressing member and wears. A secondary transfer roller 407 according to the comparative example also includes an elastic layer 407*c* on a core metal portion 407*b*. Instead of the elastic layer 407*c*, a surface layer having no elasticity may be disposed.

As compared with the comparative example, the pressing structure according to the present embodiment has the following advantages. In other words, since the pressing section bearing 463 can be eliminated, cost reduction and space saving can be achieved. A bearing that withstands a high radial load is preferably selected, and then the configuration can avoid an increase in the size of the machine.

Figure 6A:
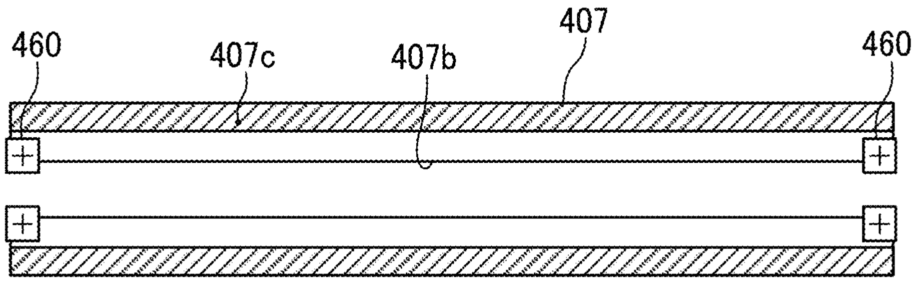
FIG. 6A is a schematic diagram of a replacement part of a secondary transfer unit, according to an embodiment of the present disclosure.
Figure 6B:
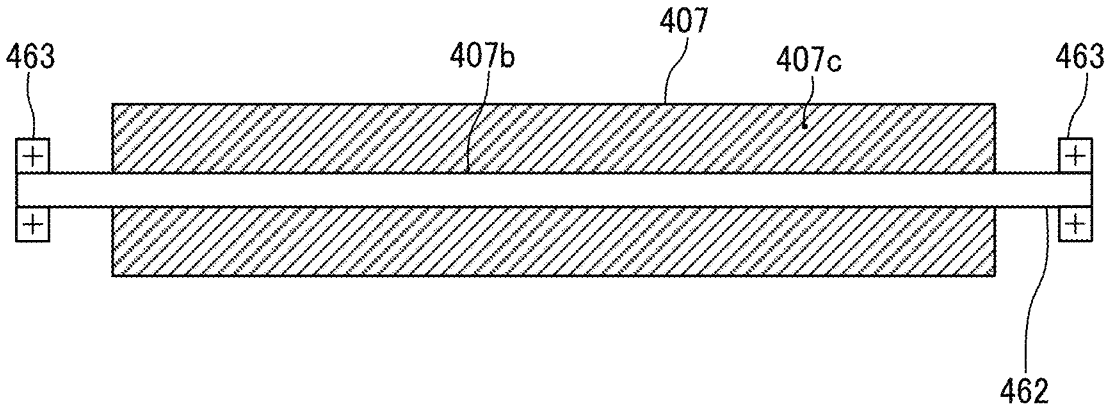
FIG. 6B is a schematic diagram of a replacement part of a secondary transfer unit, according to a comparative example.

Although transfer quality is typically maintained by periodically replacing the secondary transfer roller 407, in the case of the configuration of the secondary transfer roller 407 according to the present embodiment, an object to be replaced can be only a portion of the fixed shaft excluding the support shaft portion 407*a*. FIG. 6A illustrates a replacement unit of the secondary transfer roller 407 according to an embodiment of the present embodiment, and FIG. 6B illustrates a replacement unit of a secondary transfer roller of a comparative example. In the present embodiment, product maintenance costs can also be reduced. The bearing 460 may be replaced together with the secondary transfer roller 407 or may be continuously used together with the support shaft portion 407*a*.

Typically, the secondary transfer roller 407 is integrated with, for example, a sheet conveyance guide and a mechanism for cleaning the surface of the secondary transfer roller 407, so that the secondary transfer roller 407 can indirectly press a frame of the secondary transfer unit 40 that holds the sheet conveyance guide and the mechanism. A problem may occur that an error of the secondary transfer pressure increases, for the reason that a plurality of components are interposed between the secondary transfer roller 407 and the pressing arm and dimensional errors increase. Moreover, an error of the secondary transfer pressure may increase due to, for example, deformation of the frame. On the other hand, in the pressing structure of the present embodiment, the secondary transfer roller 407 is rotatably mounted coaxially with a non-rotatable fixed shaft and presses both ends of the fixed shaft to form the secondary transfer nip, so that an error of the secondary transfer pressure can be reduced.

Figure 7A:
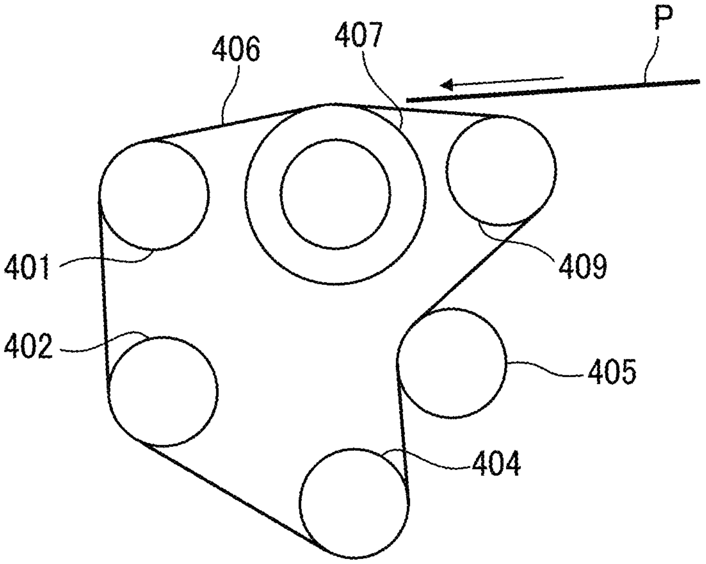
FIG. 7A is a schematic diagram of the belt supporting structure of a secondary transfer unit, according to an embodiment of the present disclosure.
Figure 7B:
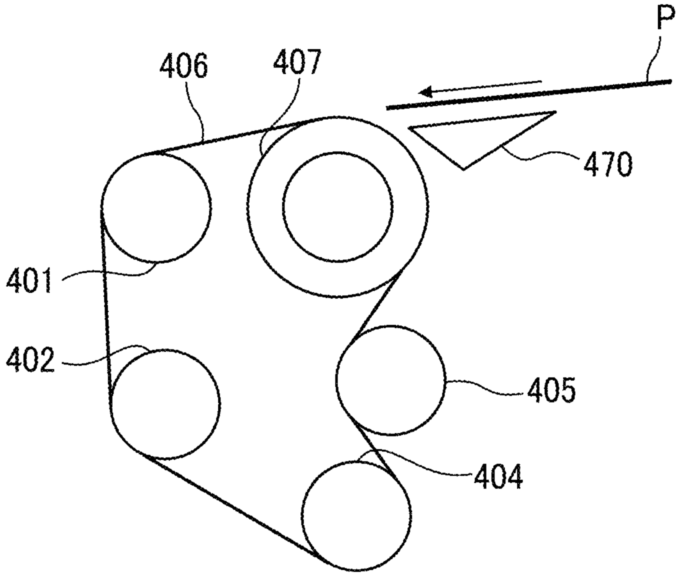
FIG. 7B is a schematic diagram of the belt supporting structure of a secondary transfer unit, according to a comparative example.

FIG. 7A is a schematic diagram of the belt supporting structure of a secondary transfer unit 40 according to an embodiment of the present embodiment, and FIG. 7B is a schematic diagram of the belt supporting structure of a secondary transfer unit 40 according to a comparative example. In FIG. 7A, the secondary transfer belt 406 is supported by the following rollers. The transfer belt 406 is supported by a secondary transfer roller 407 that forms a nip for transferring toner, a separation roller 401 for separating sheets stuck to the belt, a driven roller 402 that faces, via the belt, a sensor for detecting toner density of toner on the belt, a drive roller 404 that is a roller facing a blade for cleaning toner on the belt, a tension roller 405 for applying belt tension, and the skew prevention roller 409. The number of driven rollers in FIG. 7A is fewer than that in the example illustrated in FIG. 1 by one driven roller, but the same number of driven rollers as in FIG. 1 may be disposed.

A frame that holds the rollers forms an integrated structure. In the configuration of the present embodiment, a roller other than the secondary transfer roller 407 is set as a drive roller. In FIGS. 7A and 7B, a cleaning counter roller is used as the drive roller 404. Since the secondary transfer roller 407 is a driven roller driven by a belt to rotate, a belt winding amount and an arrangement position can be set as desired. Since the secondary transfer roller 407 is driven via the belt, only the surface of the secondary transfer roller 407 can rotate with respect to a fixed shaft as illustrated in FIG. 5A. Since there is no limitation on the winding amount of the belt around the secondary transfer roller, a nip forming roller can be disposed instead of a sheet conveyance guide 470 illustrated in FIG. 7B.

In an example illustrated in FIG. 7A, the skew prevention roller 409 has the function of the nip forming roller. A roller without a skew prevention function may be used as the nip forming roller. The nip forming roller determines an angle (nip angle) of a belt stretched portion between the nip forming roller and the secondary transfer roller 407 with respect to the surface of the intermediate transfer belt 31, and a sheet entry angle to the belt stretched portion.

In the comparative example illustrated in FIG. 7B, a method is adopted in which a belt is driven by a drive input to the secondary transfer roller 407. The drive transmission member is connected with the rotatable shaft 462 (a core metal, see FIG. 5B) of the secondary transfer roller 407 to drive the secondary transfer roller 407. For this reason, the shaft is to be rotated as a whole. At least a certain amount of the belt needs to be wound around the secondary transfer roller 407 at the time of a drive input to the secondary transfer roller 407. For this reason, typically, as illustrated in FIG. 7B, the sheet conveyance guide 470 is disposed separately at a sheet entrance portion.

In the present embodiment, various types of sheet P are used, such as plain paper, thick paper, a postcard, an envelope, thin paper, coated paper (such as coated paper and art paper), tracing paper, and an overhead projector (OHP) sheet. The optimum secondary transfer pressure (nip pressure) varies according to the type of sheet P. Accordingly, the secondary transfer pressure is adjusted according to the type of recording material. For example, a user operates an operation panel included in the body of the printer to input information on the type of sheet P set in the sheet tray 60. The controller of the printer according to the present embodiment sets the driving time of the pressing motor 71 based on the input information on the type of the sheet P. When the pressing motor 71 is a stepping motor, the number of steps is set based on input information on the type of the sheet P. In order to grasp the rotation position of the pressing cam 74, a detection sensor is disposed to detect whether the pressing cam 74 is positioned at a cam rotation position or a home position.

Figure 8:
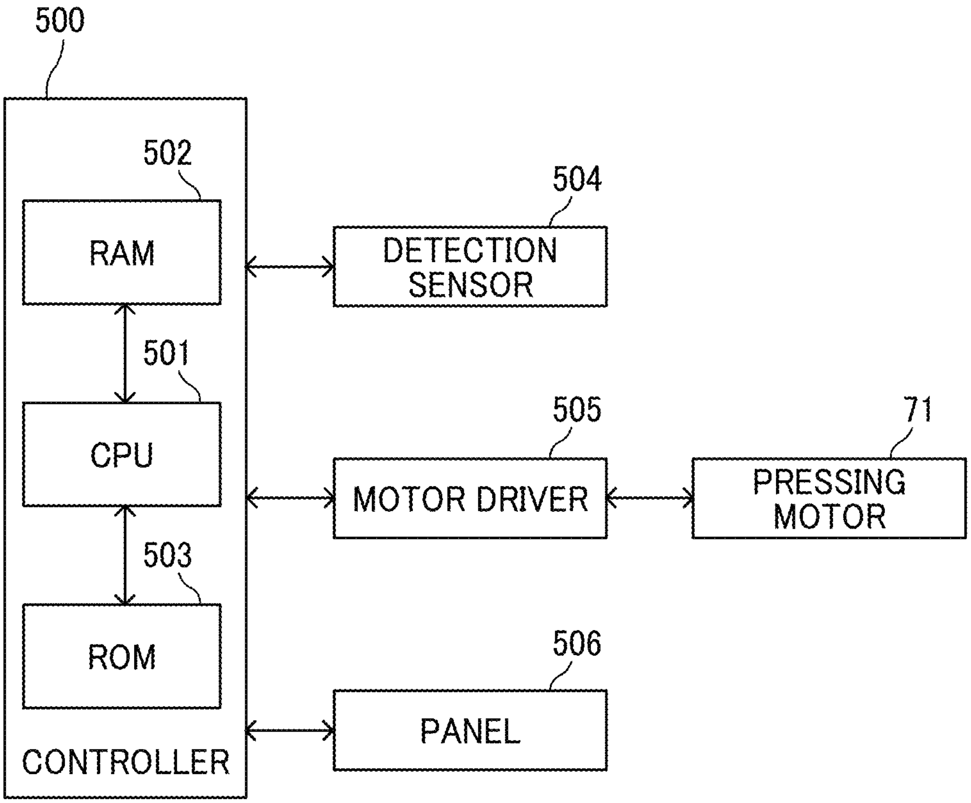
FIG. 8 is a block diagram of electrical components.

FIG. 8 is a block diagram of an electrical component related to pressing motor control. In FIG. 8, a controller 500 includes, for example, a central processing unit (CPU) 501 as an arithmetic device, a random-access memory (RAM) 502 as a data storage device, and a read-only memory (ROM) 503 as a data storage device. The controller 500 controls the driving of various devices in the printer and sets operating conditions. A detection sensor 504 for detecting, for example, the above-described cam rotation position is connected to the controller 500. The pressing motor 71 is connected to the controller 500 via a motor driver 505. A panel 506 operated by an operator is also connected to the controller 500.

In the ROM 503, a relationship between a paper type and paper thickness, which is determined based on a preliminary experiment, and a cam rotation position corresponding to an optimum pressure amount is stored in the form of, for example, a data table. An optimum cam rotation position is obtained from a paper-type selection input (type selection input) input by an operator via the panel 506 and a table storing a relationship between a paper type and paper thickness.

The cam 74 is driven for the drive time (or the number of steps) set corresponding to the optimal rotation position of the cam, so that the position in the rotation direction of the pressing cam 74 that contacts the cam receiving roller 73 turns to be a position corresponding to the type of sheet. Thus, the pressing force of the pressing arm 72 on the support shaft portion 407*a* is adjusted corresponding to the type of sheet. As a result, the force acting on the secondary transfer nip is adjusted to a force corresponding to the type of sheet, and is a secondary transfer pressure corresponding to the type of sheet.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of the present disclosure. For example, the image forming apparatus is not limited to the printer and may be, for example, a copier, a stand-alone fax machine, or a multifunction peripheral including at least two functions of a copier, a printer, a fax machine, and a scanner. The belt device is not limited to the secondary transfer belt device, and is applicable to various belt devices. The pressing device is not limited to the secondary transfer device, and is applicable to devices that apply pressure to pressed units including various rotatable rollers. The effects obtained by the above-described embodiment are examples. The effects according to the present disclosure are not limited to the above-described effects.

The above-described embodiments are given as examples, and, for example, the following aspects of the present disclosure may have advantageous effects described below. In the description of the aspects, reference signs in parentheses after the names of elements are examples of corresponding members, and are not limited to the examples.

First Aspect

In the first aspect, a transfer device including a pressed unit (e.g., the pressed unit 40) that is movably supported, a rotatable roller (e.g., the secondary transfer roller 407) that is rotatably supported by the pressed unit, and a pressing member (e.g., the pressing arm 72) to press the pressed unit. The rotatable roller is rotatably supported by a first non-rotatable shaft portion (e.g., the support shaft portion 407*a*) of the pressed unit. The pressing member contacts and presses a second non-rotatable shaft portion (e.g., the support shaft portion 407*a*) of the pressed unit that has an axial center aligned with an axial center of the first non-rotatable shaft portion of the pressed unit. According to this configuration, a portion that is directly pressed by the pressing member for pressing is the second non-rotatable shaft portion of the pressed unit, the axial center of which is aligned with the axial center of the first non-rotatable shaft portion that rotatably supports the rotatable roller. Unlike the configuration of the comparative example, there are no intervening components from the portion pressed by the pressing member to the rotatable roller. Thus, an error in the pressing force applied to the rotatable roller due to a dimensional error in the components can be reduced.

Second Aspect

In the transfer device according to the first aspect, the pressed unit (e.g., the pressed unit 40) includes a belt (e.g., the secondary transfer belt 406) supported by a plurality of support members (e.g., the rollers 401 to 405, 407, and 409) including the rotatable roller (e.g., the rotatable roller 407). According to this configuration, an error in the pressing force applied via the belt can be reduced. Using a belt unit makes it easy to use a roller other than the rotatable roller as a drive roller and transmit drive to the rotatable roller via a belt. The first aspect may also include an aspect in which a rotator directly forms a transfer nip with an image bearer without interposing the belt.

Third Aspect

In the transfer device according to the second aspect, the rotatable roller (e.g., the rotatable roller 407) is a driven roller that is rotated by rotation of the belt (e.g., the secondary transfer belt 406), and the plurality of support members (e.g., the rollers 401 to 405, 407, and 409) includes a drive roller to drive the belt to rotate. According to this configuration, a roller other than the rotatable roller is used as the drive roller, so that the sheet entry angle at the transfer nip can be set by the trajectory of the belt. Thus, the number of components such as the sheet conveyance guide can be reduced.

Fourth Aspect

In the transfer device according to any one of the first to third aspects, the rotatable roller (e.g., the rotatable roller 407) has a hollow core metal. According to this configuration, a hollow member (pipe member) can be used as a core metal of the rotatable roller, and then material and transportation costs and product maintenance costs can be reduced.

Fifth Aspect

In the transfer device according to the first aspect, the first non-rotatable shaft portion (e.g., the support shaft portion 407*a*) is a shaft member, both ends of which are non-rotatably supported by sidewalls of the pressed unit (e.g., the pressed unit 40), and the second non-rotatable shaft portion (e.g., the support shaft portion 407*a*) is a part of the shaft member. According to this configuration, the support of the rotatable roller (e.g., the rotatable roller 407) and the contact portion of the pressing member (e.g., the pressing arm 72) can be configured with a simple configuration of a single shaft member. In the first aspect, both ends may be non-rotatably supported by the side walls of the pressing unit (e.g., the pressing unit 70) and the first non-rotatable shaft portion may be formed by an element other than the shaft member. For example, a shaft configuration in which an outer circumferential face of an end of the rotatable roller is held by shaft portions individually disposed on inner faces of both side walls, a configuration in which a hollow core metal is used as a rotatable roller and both ends of the hollow core metal are supported from inside by shaft portions individually provided on inner faces of both side walls, are included.

Sixth Aspect

In the transfer device according to any one of the first to fifth aspects, the rotatable roller (e.g., the rotatable roller 407) forms a transfer nip with the rotatable roller pressed against an image bearer by the pressing member (e.g., the pressing arm 72). According to this configuration, an error of the pressing force at the transfer nip can be reduced. The first aspect may include an aspect in which the rotatable roller directly contacts the image bearer to form a transfer nip and an aspect in which the rotatable roller indirectly contacts the image bearer via a belt member to form the transfer nip.

Seventh Aspect

In the seventh aspect, the transfer device according to the first aspect further includes a pressing force adjuster (e.g., the controller 500, the pressing motor 71, the detection sensor 504, and the motor driver 505) to adjust a pressing force of the pressing member (e.g., the pressing arm 72) to the pressed unit (e.g., the pressed unit 40). According to this configuration, the pressing force can be adjusted to an optimum value according to the paper type to be fixed.

Eighth Aspect

In the transfer device according to the seventh aspect, the pressing force adjuster (e.g., the controller 500, the pressing motor 71, the detection sensor 504, and the motor driver 505) includes a cam (e.g., the pressing cam 74) to contact the pressing member (e.g., the pressing arm 72), a pressure drive source (e.g., the pressing motor 71) to drive the cam to rotate, and a sensor (e.g., the detection sensor 504) to detect a rotation position of the cam. According to this configuration, the pressing force can be adjusted to an optimum value by controlling the rotation angle position of the cam. A pressure amount adjustment mechanism including a cam, a motor, and a sensor is disposed to enable the secondary transfer pressure amount to be set in more detail.

Ninth Aspect

In the ninth aspect, an image forming apparatus (e.g., the printer 100) includes the transfer device according to any one of the first to eighth aspects. According to this configuration, a satisfactory image can be formed with transfer pressure without error.

Tenth Aspect

In the tenth aspect, a pressing device (e.g., the secondary transfer device 400) includes a pressed unit (e.g., the pressed unit 40) that is movably supported, a rotatable roller (e.g., the secondary transfer roller 407) that is rotatably supported by the pressed unit, a pressing member (e.g., the pressing arm 72) that presses the pressed unit, and a pressing force adjuster (e.g., the controller 500, the pressing motor 71, the detection sensor 504, and the motor driver 505) to adjust the pressing force of the pressing member to the pressed unit. The rotatable roller is rotatably supported by a first non-rotatable shaft portion (e.g., the support shaft portion 407a) of the pressed unit. The pressing member contacts and presses a second non-rotatable shaft portion (e.g., the support shaft portion 407a) of the pressed unit that has an axial center aligned with an axial center of the first non-rotatable shaft portion. According to this configuration, pressure without error can be applied in the axial direction.

Eleventh Aspect

In the eleventh aspect, a belt device includes a pressed unit (e.g., the pressed unit 40) that is movably supported, a pressing member (e.g., the pressing arm 72) that presses the pressed unit, and a belt (e.g., the secondary transfer belt 406) that is supported by a plurality of support members (e.g., the rollers 401 to 405, 407, and 409) including a rotatable roller (e.g., the secondary transfer roller 407) that is rotatably supported by the pressed unit. The rotatable roller is rotatably supported by a first non-rotatable shaft portion (e.g., the support shaft portion 407a) of the pressed unit. The pressing member contacts and presses a second non-rotatable shaft portion (e.g., the support shaft portion 407a) of the pressed unit that has an axial center aligned with an axial center in the first non-rotatable shaft portion. According to this configuration, pressure with a small error can be applied.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A transfer device comprising:
a pressed unit movably supported, the pressed unit including:
a first non-rotatable shaft portion; and
a second non-rotatable shaft portion;
a rotatable roller rotatably supported by the first non-rotatable shaft portion of the pressed unit; and
a pressing member to contact the second non-rotatable shaft portion of the pressed unit and press the pressed unit, the second non-rotatable shaft portion having an axial center aligned with an axial center of the first non-rotatable shaft portion.

2. The transfer device according to claim 1,
wherein the pressed unit includes:
a plurality of support members including the rotatable roller; and
a belt supported by the plurality of support members.

3. The transfer device according to claim 2,
wherein the rotatable roller is a driven roller that is rotated by rotation of the belt, and
wherein the plurality of support members includes a drive roller different from the rotatable roller to drive the belt to rotate.

4. The transfer device according to claim 3,
wherein the rotatable roller has a hollow core metal.

5. The transfer device according to claim 1,
wherein the first non-rotatable shaft portion is a shaft member, both ends of which are non-rotatably supported by sidewalls of the pressed unit, and
wherein the second non-rotatable shaft portion is a part of the shaft member.

6. The transfer device according to claim 1,
wherein the rotatable roller forms a transfer nip with the rotatable roller pressed against an image bearer by the pressing member.

7. The transfer device according to claim 1, further comprising a pressing force adjuster to adjust a pressing force of the pressing member to the pressed unit.

8. The transfer device according to claim 7,
wherein the pressing force adjuster includes a cam to contact the pressing member, a pressure drive source to rotate the cam, and a sensor to detect a rotation position of the cam.

9. An image forming apparatus comprising the transfer device according to claim 1.

10. A pressing device comprising:
a pressed unit movably supported, the pressed unit including:
a first non-rotatable shaft portion; and
a second non-rotatable shaft portion:
a rotatable roller rotatably supported by the first non-rotatable shaft portion of the pressed unit;
a pressing member to contact the second non-rotatable shaft portion of the pressed unit and press the pressed unit, the second non-rotatable shaft portion having an axial center aligned with an axial center of the first non-rotatable shaft portion; and
a pressing force adjuster to adjust a pressing force of the pressing member to the pressed unit.

11. A belt device comprising:
a pressed unit movably supported, the pressed unit including:
a first non-rotatable shaft portion; and
a second non-rotatable shaft portion;
a rotatable roller rotatably supported by the first non-rotatable shaft portion of the pressed unit;
a plurality of support members including the rotatable roller;
a belt supported by the plurality of support members; and
a pressing member to contact the second non-rotatable shaft portion of the pressed unit and press the pressed unit, the second non-rotatable shaft portion having an axial center aligned with an axial center of the first non-rotatable shaft portion.

* * * * *